United States Patent
Ootake et al.

(10) Patent No.: US 9,461,575 B2
(45) Date of Patent: Oct. 4, 2016

(54) ROTARY ELECTRIC MACHINE CONTROL APPARATUS

(71) Applicant: DENSO CORPORATION, Kariya, Aichi-pref. (JP)

(72) Inventors: Hiroyasu Ootake, Gamagori (JP); Nobuyori Nakajima, Kariya (JP); Takafumi Satou, Obu (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 14/827,563

(22) Filed: Aug. 17, 2015

(65) Prior Publication Data
US 2016/0056745 A1 Feb. 25, 2016

(30) Foreign Application Priority Data
Aug. 19, 2014 (JP) .................... 2014-166606

(51) Int. Cl.
*H02P 21/00* (2016.01)
*H02P 21/14* (2016.01)
*H02P 21/05* (2006.01)

(52) U.S. Cl.
CPC ............ *H02P 21/14* (2013.01); *H02P 21/05* (2013.01)

(58) Field of Classification Search
CPC ......... H02P 21/22; H02P 27/06; H02P 21/14
USPC ........... 318/400.02, 400.04, 400.06, 400.26, 318/619, 448, 611, 624
See application file for complete search history.

(56) References Cited

U.S. PATENT DOCUMENTS

| | | | | |
|---|---|---|---|---|
| 5,994,867 A * | 11/1999 | Birk | .................. | H02P 21/24 318/609 |
| 6,407,531 B1 * | 6/2002 | Walters | .................. | H02P 6/085 318/805 |
| 6,541,937 B2 * | 4/2003 | Kato | .................. | H02P 21/22 318/632 |
| 7,116,067 B2 * | 10/2006 | Ma | .................. | H02P 6/08 318/151 |
| 8,729,838 B2 * | 5/2014 | Rozman | .................. | G05B 11/01 318/400.01 |

FOREIGN PATENT DOCUMENTS

JP H08-191600 A 7/1996

* cited by examiner

*Primary Examiner* — Bentsu Ro
*Assistant Examiner* — Thai Dinh
(74) *Attorney, Agent, or Firm* — Knobbe, Martens, Olson & Bear, LLP

(57) ABSTRACT

A rotary electric machine control apparatus controlling drive of a rotary electric machine includes a pre-limit d-axis voltage arithmetic portion calculating a pre-limit d-axis voltage command value; a pre-limit q-axis voltage arithmetic portion calculating a pre-limit q-axis voltage command value; a d-axis limit portion calculating a d-axis voltage command value; and a q-axis limit portion calculating a q-axis voltage command value. When an absolute value of the pre-limit q-axis voltage command value is greater than an absolute value of a second limit value, and an absolute value of a previous q-axis voltage command value is equal to or greater than the absolute value of the second limit value and is equal to or less than an absolute value of a first limit value, the q-axis limit portion determines a previous q-axis voltage command value as the q-axis voltage command value.

8 Claims, 9 Drawing Sheets

$$Vq\_max\_H = \sqrt{(V\_max)^2 - (Vd^*)^2} \quad \cdots (1)$$

$$Vq\_max\_L = Vq\_max\_H - \Delta V \quad \cdots (2)$$

$$Vq\_max\_L = \sqrt{(V\_max\_L)^2 - (Vd^*)^2} \quad \cdots (13)$$

ROTARY ELECTRIC MACHINE CONTROL APPARATUS

CROSS REFERENCE TO RELATED APPLICATION

This application is based on Japanese Patent Application No. 2014-166606 filed on Aug. 19, 2014, the disclosure of which is incorporated herein by reference.

TECHNICAL FIELD

The present disclosure relates to a rotary electric machine control apparatus.

BACKGROUND

Patent literature 1: JP H08-191600 A

Conventionally, a current control apparatus controls current supplied to an electric motor through an inverter. For example, patent literature 1 controls voltages of a d-axis and a q-axis, so that the sum of squares of a d-axis voltage command value and a q-axis voltage command value becomes a constant value and an output voltage of the inverter is not saturated.

The inventors of the present disclosure have found the following.

As described in patent literature 1, when the d-axis voltage command value and the q-axis voltage command value are controlled so that the sum of the squares of the d-axis voltage command value and the q-axis voltage command value is constant, the q-axis voltage command value may change according to a change of the d-axis voltage command value. When the q-axis command value changes, torque of an electric motor may change and noise and vibration may increase.

SUMMARY

It is an object of the present disclosure to provide a rotary electric machine control apparatus that enable to prevent noise and vibration.

According to one aspect of the present disclosure, a rotary electric machine control apparatus controlling drive of a rotary electric machine with applied voltage controlled by an inverter is provided. The rotary electric machine control apparatus includes a pre-limit d-axis voltage arithmetic portion calculating a pre-limit d-axis voltage command value on a basis of a d-axis current command value and a d-axis current detection value; a pre-limit q-axis voltage arithmetic portion calculating a pre-limit q-axis voltage command value on a basis of a q-axis current command value and a q-axis current detection value; a d-axis limit portion limiting the pre-limit d-axis voltage command value to calculate a d-axis voltage command value; and a q-axis limit portion limiting the pre-limit q-axis voltage command value to calculate a q-axis voltage command value. A dead zone width is defined between a first limit value and a second limit value. The dead zone width relates to a limitation of the pre-limit q-axis voltage command value. An absolute value of the first limit value is greater than an absolute value of the second limit value. When an absolute value of the pre-limit q-axis voltage command value is greater than the absolute value of the second limit value, and an absolute value of a previous q-axis voltage command value is equal to or greater than the absolute value of the second limit value and is equal to or less than the absolute value of the first limit value, the q-axis limit portion determines the previous q-axis voltage command value as the q-axis voltage command value. The previous q-axis voltage command value is the q-axis voltage command value in a immediately previous calculation.

According to another aspect of the present disclosure, a rotary electric machine control apparatus controlling drive of a rotary electric machine with applied voltage controlled by an inverter is provided. The rotary electric machine control apparatus includes a pre-limit d-axis voltage arithmetic portion calculating a pre-limit d-axis voltage command value on a basis of a d-axis current command value and a d-axis current detection value; a pre-limit q-axis voltage arithmetic portion calculating a pre-limit q-axis voltage command value on a basis of a q-axis current command value and a q-axis current detection value; a d-axis limit portion limiting the pre-limit d-axis voltage command value to calculate a d-axis voltage command value; and a q-axis limit portion limiting the pre-limit q-axis voltage command value to calculate a q-axis voltage command value. A dead zone width is defined between a first saturation rate and a second saturation rate. The dead zone width relates to a limitation of a pre-limit saturation rate. An absolute value of the first saturation rate is greater than an absolute value of the second saturation rate. When an absolute value of the pre-limit saturation rate is greater than the absolute value of the second saturation rate, and an absolute value of a previous command saturation rate is equal to or greater than the absolute value of the second saturation rate and is equal to or less than the absolute value of the first saturation rate, the q-axis limit portion determines a previous q-axis voltage command value as the q-axis voltage command value. The previous command saturation rate is a rate of the previous q-axis voltage command value to a maximum voltage value. The pre-limit saturation rate is a ratio of the pre-limit q-axis voltage command value to a maximum voltage value.

According to the rotary electric machine control apparatus, a dead zone is provided between the first limit value and the second limit value. When the absolute value of the pre-limit q-axis voltage command value is greater than the absolute value of the second limit value and the previous q-axis voltage command value is within the dead zone width, the q-axis voltage command value is equal to the previous q-axis voltage command value, so that a previous value is taken over. Accordingly, when the d-axis voltage command value changes, since the q-axis voltage command value is prevented from changing, it is possible to reduce noise and vibration according to torque fluctuation.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
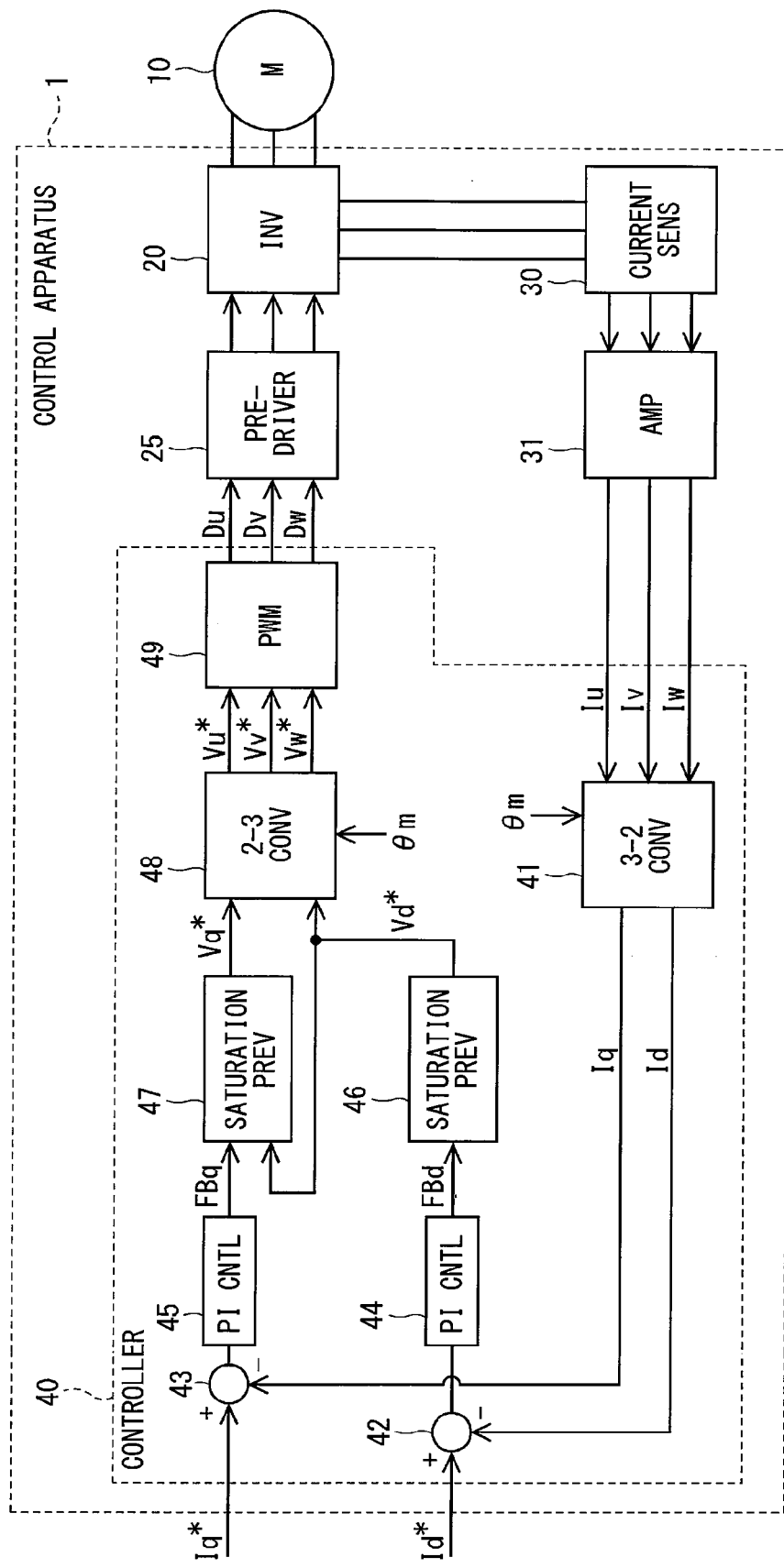
FIG. 1 is a block diagram illustrating a configuration a rotary electric machine control apparatus in a first embodiment.

A rotary electric machine control apparatus as one embodiment of the present disclosure will be explained with referring to the drawings.

First Embodiment

The rotary electric machine control apparatus in a first embodiment will be explained with referring to FIG. 1 to FIG. 5B. Incidentally, an identical symbol will be given to the identical element in the following multiple embodiments and an explanation will be omitted.

As described in FIG. 1, the rotary electric machine control apparatus 1 drives and controls a motor 10. The motor 10 is an example of a rotary electric machine. The rotary electric machine control apparatus 1 is used in an electric power steering (EPS) apparatus that supports steering operation of a vehicle with the motor 10, for example.

The motor 10 is a three-phase brushless motor, and is driven with electric power of a not-shown battery. The motor 10 may be a motor other than the three-phase brushless motor.

The rotary electric machine control apparatus 1 is configured from an electronic control unit (ECU). The rotary electric machine control apparatus 1 includes an inverter 20, a current sensor 30, and a controller 40, or the like.

The inverter 20 is a three-phase inverter. The inverter 20 is bridge connected with not-shown six switching elements. The switching element is a metal oxide semiconductor field-effect transistor (MOSFET) that is a kind of a field-effect transistor, for example. The switching element is not limited to the MOSFET. The switching element may be an insulated gate bipolar transistor (IGBT), a thyristor, or the like. Two of the six switching elements make one switching element pair. One of the two switching elements is connected to a high voltage side, and the other of the two switching elements is connected to a low voltage side. There are three switching element pairs. Connection points of a high-voltage-side switching element and a low-voltage-side switching element in three switching element pairs are connected to a U-phase coil, a V-phase coil, and a W-phase coil in the motor 10, respectively.

The controller 40 controls on-and-off operation of the switching element through a predriver 25 and the inverter 20. The inverter 20 converts an electric power supplied from the not-shown battery and supplies power to the motor 10.

The current sensor 30 includes a shunt resistance and a Hall IC. A detection value of the current sensor 30 is outputted to the controller 40 through an amplifying circuit 31.

The controller 40 controls the whole of the rotary electric machine control apparatus 1. The controller 40 is configured from a microcomputer that performs various arithmetic processing.

The controller 40 has a three-phase to two-phase converter 41, a d-axis subtractor 42, a q-axis subtractor 43, a d-axis PI controller 44, a q-axis PI controller 45, a d-axis saturation prevention arithmetic portion 46, a q-axis saturation prevention arithmetic portion 47, a two-phase to three-phase converter 48, and a PWM converter 49. Each functional block configuring the controller 40 may be configured by software, hardware, or a combination of software and hardware. A d-axis saturation prevention may also be referred to as a d-axis saturation guard. A q-axis saturation prevention may also be referred to as a q-axis saturation guard.

The three-phase to two-phase converter 41 obtains a U-phase current signal with respect to a U-phase current Iu, a V-phase current signal with respect to a V-phase current Iv, and a W-phase current signal with respect to a W-phase current Iw, which are transmitted from the current sensor 30. The three-phase to two-phase converter 41 obtains an electric angle θm from a not-shown rotation angle sensor detecting a rotation of a rotor of the motor 10. The three-phase to two-phase converter 41 converts the U-phase current Iu, the V-phase current Iv, and the W-phase current Iw to a d-axis current Id and a q-axis current Iq by a dq conversion based on the electrical angle θm. Accordingly, the U-phase current Iu, the V-phase current Iv, and the W-phase current Iw are converted to dq coordinates from three-phase coordinate. In the present embodiment, the d-axis current Id corresponds to an example of a d-axis current detection value, and the q-axis current Iq corresponds to an example of a q-axis current detection value.

The d-axis subtractor 42 calculates a d-axis current deviation ΔId that corresponds to a difference between the d-axis current command value Id* and the d-axis current Id. The q-axis subtractor 43 calculates a q-axis current deviation ΔIq that corresponds to a difference between the q-axis current command value Iq* and the q-axis current Iq.

The d-axis current command value Id* and the q-axis current command value Iq* are calculated in a not-shown command arithmetic portion according to, for example, a steering torque, a vehicle speed, or the like.

The d-axis PI controller 44 calculates a pre-limit d-axis voltage command value FBd by PI calculation, so that the d-axis current Id, which is an actual current, follows the d-axis current command value Id*, based on the d-axis current deviation ΔId input from the d-axis subtractor 42.

The q-axis PI controller 45 calculates a pre-limit q-axis voltage command value FBq by PI calculation, so that a q-axis current Id, which is an actual current, follows the q-axis current command value Iq*, based on the q-axis current deviation ΔIq input from the q-axis subtractor 43.

The d-axis saturation prevention arithmetic portion 46 performs d-axis limit processing that limit the pre-limit d-axis voltage command value FBd. The d-axis saturation prevention arithmetic portion 46 calculates the d-axis voltage command value Vd*, so that an output voltage from the inverter 20 is prevented from saturating.

The q-axis saturation prevention arithmetic portion 47 performs q-axis limit processing that limit the pre-limit q-axis voltage command value FBq, and calculates the q-axis voltage command value Vq*, so that an output voltage from the inverter 20 is prevented from saturating.

In the present embodiment, so that an output voltage from the inverter 20 is prevented from exceeding a maximum voltage value V_max, the pre-limit d-axis voltage command value FBd and the pre-limit q-axis voltage command value FBq are controlled (guarded).

The detail of the limit processings in the d-axis saturation prevention arithmetic portion 46 and the q-axis saturation prevention arithmetic portion 47 will be explained later.

The two-phase to three-phase converter 48, based on the electrical angle θm, converts the d-axis voltage command value Vd* and the q-axis voltage command value Vq* into the U-phase voltage command value Vu*, the V-phase voltage command value Vv*, and the W-phase voltage command value Vw*, which are the voltage command values in the three phases, by an inverse dq transformation.

Based on the U-phase voltage command value Vu*, the V-phase voltage command value Vv* and the W-phase voltage command value Vw*, the PWM converter 49 calculates a U-phase duty Du, a V-phase duty Dv, and a W-phase duty Dw corresponding to a rate of an on period of the switching element in each phase.

The predriver 25 converts the U-phase duty Du, the V-phase duty Dv, and the W-phase duty Dw, which are outputted from the PWM converter 49, to a drive signal. On the basis of the drive signal, the on-and-off operation of the switching element in the inverter 20 is controlled.

Accordingly, the controller 40 performs a PWM control regarding the motor 10 through the inverter 20.

Figure 2:
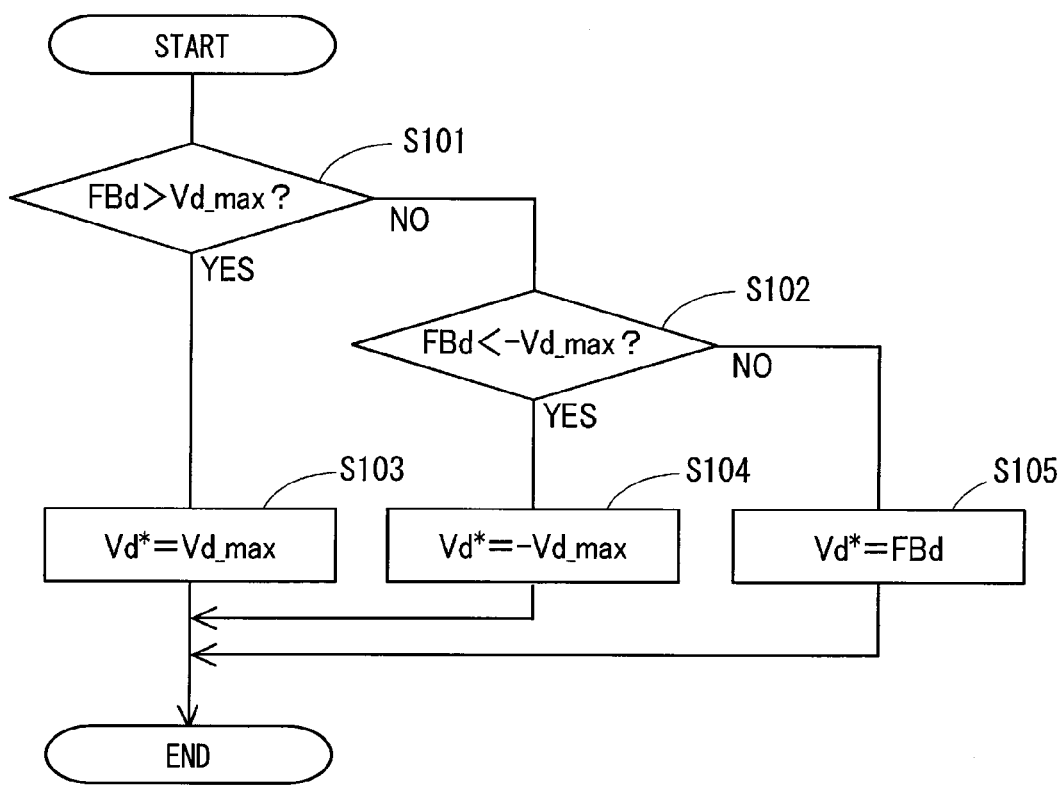
FIG. 2 is a flowchart illustrating d-axis limit processing in the first embodiment.

The d-axis limit processing performed by the d-axis saturation prevention arithmetic portion 46 will be explained with referring to a flowchart illustrated in FIG. 2.

At S101, it is determined whether the pre-limit d-axis voltage command value FBd is greater than the d-axis saturation prevention value Vd_max in a possible side. Incidentally, the d-axis saturation prevention value Vd_max is a constant value determined according to a permissible advanced angle on the basis of the maximum voltage value V_max (referring to FIG. 4A and FIG. 4B). The maximum voltage value V_max is determined so that the output voltage of the inverter 20 is prevented from saturating. When it is determined that the pre-limit d-axis voltage command value FBd is greater than the positive-side d-axis saturation prevention value Vd_max (S101: YES), the processing shifts to S103. When it is determined that the pre-limit d-axis voltage command value FBd is equal to or less than the positive-side d-axis saturation prevention value Vd_max (S101: NO), the processing shifts to S102.

At S102, it is determined whether the pre-limit d-axis voltage command value FBd is less than a negative-side d-axis saturation prevention value −Vd_max. When it is determined that the pre-limit d-axis voltage command value FBd is less than the negative-side d-axis saturation prevention value −Vd_max (S102: YES), the processing shifts to S104.

When it is determined that the pre-limit d-axis voltage command value FBd is greater than the negative-side d-axis saturation prevention value −Vd_max (S102: NO), the processing shifts to S105.

When it is determined that the pre-limit d-axis voltage command value FBd is greater than the positive-side d-axis saturation prevention value Vd_max (S101: YES), the processing shifts to S103. At S103, the positive-side d-axis saturation prevention value Vd_max is defined as the d-axis voltage command value Vd*.

When it is determined that the pre-limit d-axis voltage command value FBd is less than the negative-side d-axis saturation prevention value −Vd_max (S102: YES), the processing shifts to S104. At S104, the negative-side d-axis saturation prevention value −Vd_max is defined as the d-axis voltage command value Vd*.

When the pre-limit d-axis voltage command value FBd is equal to or greater than the negative-side d-axis saturation prevention value −Vd_max and is equal to or less than the positive-side d-axis saturation prevention value Vd_max (S101: NO and also S102: NO), the processing shifts to S105. At S105, the pre-limit d-axis voltage command value FBd is defined as the d-axis voltage command value Vd*.

The calculated d-axis voltage command value Vd* is output to the q-axis saturation prevention arithmetic portion 47 and the two-phase to three-phase converter 48.

The q-axis limit processing in the q-axis saturation prevention arithmetic portion 47 will be explained with referring to a flowchart illustrated in FIG. 3.

At S201, on the basis of the d-axis voltage command value Vd*, a first q-axis saturation prevention value Vq_max_H and a second q-axis saturation prevention value Vq_max_L are calculated. The first q-axis saturation prevention value Vq_max_H is described in FIG. 10A by an expression (1). The second q-axis saturation prevention value Vq_max_L is also described in FIG. 10B by an expression (2). A ΔV in the expression shows a dead zone width. For example, the dead zone width is set to about 0.06 V.

At S202, it is determined whether the pre-limit q-axis voltage command value FBq is greater than the second positive-side q-axis saturation prevention value Vq_max_L. When it is determined that the pre-limit q-axis voltage command value FBq is equal to or less than the second positive-side q-axis saturation prevention value Vq_max_L (S202: NO), the processing shifts to S208. When it is determined that the pre-limit q-axis voltage command value FBq is greater than the second positive-side q-axis saturation prevention value Vq_max_L (S202: YES), the processing shifts to S203. Hereinafter, the processing between S203-S207, it is supposed that the pre-limit q-axis voltage command value FBq is a positive value.

At S203, it is determined whether a previous q-axis voltage command value Vq*$_{(n-1)}$ is greater than the first positive-side q-axis saturation prevention value Vq_max_H, which is calculated at S201. The previous q-axis voltage command value Vq*$_{(n-1)}$ corresponds to the q-axis voltage command value Vq* in a previous calculation. When it is determined that the previous q-axis voltage command value Vq*$_{(n-1)}$ is greater than the first positive-side q-axis saturation prevention value Vq_max_H (S203: YES), the processing shifts to S205. When it is determined that the previous q-axis voltage command value Vq*$_{(n-1)}$ is equal to or less than the first positive-side q-axis saturation prevention value Vq_max_H (S203: NO), the processing shifts to S204.

At S204, it is determined whether the previous q-axis voltage command value Vq*$_{(n-1)}$ is less than the second positive-side q-axis saturation prevention value Vq_max_L, which is calculated at S201. When it is determined that the previous q-axis voltage command value Vq*$_{(n-1)}$ is less than the second positive-side q-axis saturation prevention value Vq_max_L (S204: YES), the processing shifts to S206. When it is determined that the previous q-axis voltage command value Vq* is equal to or greater than the second positive-side q-axis saturation prevention value Vq_max_L (S204: NO), the processing shifts to S207.

When it is determined that the previous q-axis voltage command value Vq*$_{(n-1)}$ is greater than the first positive-side q-axis saturation prevention value Vq_max_H (S203: YES), the processing shifts to S205. At S205, the first positive-side q-axis saturation prevention value Vq_max_H is defined as the q-axis voltage command value Vq*.

When it is determined that the previous q-axis voltage command value Vq*$_{(n-1)}$ is less than the second positive-side q-axis saturation prevention value Vd_max_L (S204: YES), the processing shifts to S206. At S206, the second positive-side q-axis saturation prevention value Vq_max_L is defined as the q-axis voltage command value Vq*.

When the previous q-axis voltage command value Vq*$_{(n-1)}$ is equal to or greater than the second positive-side q-axis saturation prevention value Vq_max_L and is equal to or less than the first positive-side q-axis saturation prevention value Vq_max_H (S203: NO and also S204: NO), the processing shifts to S207. At S207, the previous q-axis voltage command value Vq*$_{(n-1)}$ is defined as the q-axis voltage command value Vq*.

When it is determined that the pre-limit q-axis voltage command value FBq is equal to or less than the second positive-side q-axis saturation prevention value Vd_max_L (S202: NO), the processing shifts to S208. At S208, it is determined whether the pre-limit q-axis voltage command value FBq is less than the second negative-side q-axis saturation prevention value −Vq_max_L. When it is determined that the pre-limit q-axis voltage command value FBq is equal to or greater than the second negative-side q-axis saturation prevention value −Vq_max_L (S208: NO), the processing shifts to S214. When it is determined that the pre-limit q-axis voltage command value FBq is less than the second negative-side q-axis saturation prevention value −Vq_max_L (S208: YES), the processing shifts to S209. Hereinafter, in processing between S209-S213, it is supposed that the pre-limit q-axis voltage command value FBq is a negative value.

At S209, it is determined whether the previous q-axis voltage command value Vq*$_{(n-1)}$ is less than the first negative-side q-axis saturation prevention value −Vq_max_H. When it is determined that the previous q-axis voltage command value Vq*$_{(n-1)}$ is less than the first negative-side q-axis saturation prevention value −Vq_max_H (S209: YES), the processing shifts to S211. When it is determined that the previous q-axis voltage command value Vq*$_{(n-1)}$ is equal to or greater than the first negative-side q-axis saturation prevention value −Vq_max_H (S209: NO), the processing shifts to S210.

At S210, it is determined whether the previous q-axis voltage command value Vq*$_{(n-1)}$ is greater than the second negative-side q-axis saturation prevention value −Vq_max_L. When it is determined that the previous q-axis voltage command value Vq*$_{(n-1)}$ is greater than the second negative-side q-axis saturation prevention value −Vq_max_L (S210: YES), the processing shifts to S212. When it is determined that the previous q-axis voltage command value Vq*$_{(n-1)}$ is equal to or less than the second negative-side q-axis saturation prevention value −Vq_max_H (S210: NO), the processing shifts to S213.

When it is determined that the previous q-axis voltage command value Vq*$_{(n-1)}$ is less than the first negative-side q-axis saturation prevention value −Vq_max_H (S209: YES), the processing shifts to S211. At S211, the first negative-side q-axis saturation prevention value −Vq_max_H is defined as the q-axis voltage command value Vq*.

When it is determined that the previous q-axis voltage command value Vq*$_{(n-1)}$ is greater than the second negative-side q-axis saturation prevention value −Vd_max_L (S210: YES), the processing shifts to S212. At S212, the second negative-side q-axis saturation prevention value −Vq_max_L is defined as the q-axis voltage command value Vq*.

When the previous q-axis voltage command value Vq*$_{(n-1)}$ is equal to or greater than the first negative-side q-axis saturation prevention value −Vq_max_H and is equal to or less than the second negative-side q-axis saturation prevention value −Vq_max_L (S209: NO and also S210: NO), the processing shifts to S213. At S213, the previous q-axis voltage command value Vq*$_{(n-1)}$ is defined as the q-axis voltage command value Vq*.

When the pre-limit d-axis voltage command value FBq is equal to or greater than the second negative-side q-axis saturation prevention value −Vq_max_L and is equal to or less than the second positive-side q-axis saturation prevention value Vq_max_L (S202: NO and also S208: NO), the processing shifts to S214. At S214, the pre-limit q-axis voltage command value FBq is defined as the q-axis voltage command value Vd*.

Figure 4A:
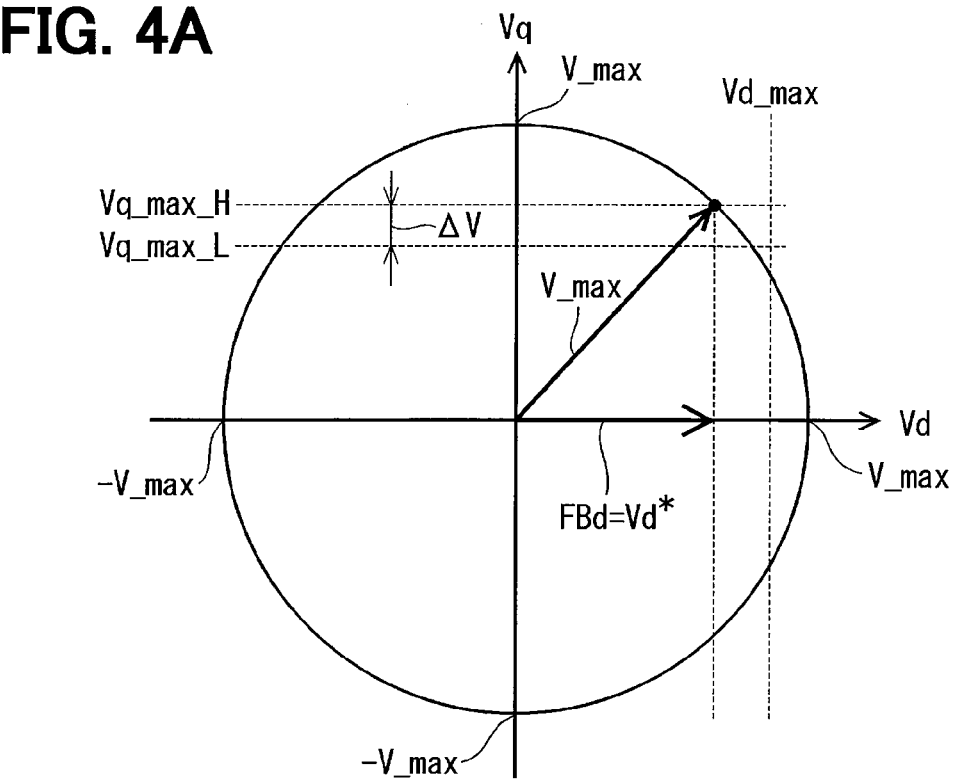
FIG. 4A is a diagram illustrating a saturation prevention value in the first embodiment.
Figure 4B:
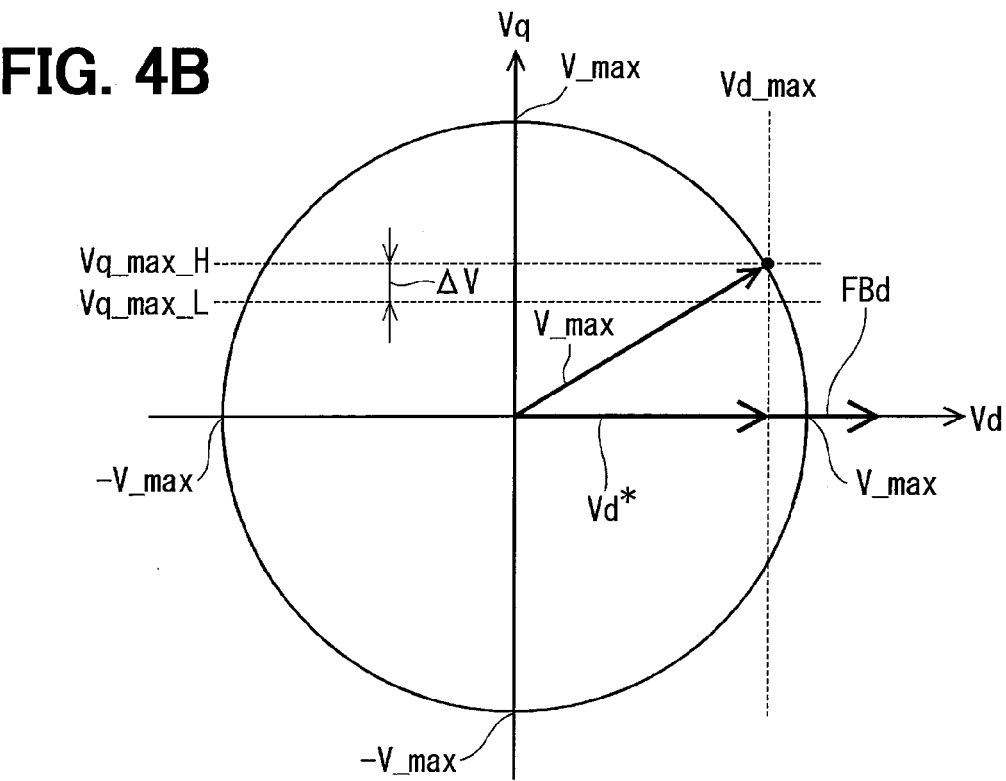
FIG. 4B is a diagram illustrating a saturation prevention value in the first embodiment.

The saturation prevention value (also referred to as a saturation guard value) will be explained with referring to FIG. 4A and FIG. 4B. In FIG. 4A and FIG. 4B, it is supposed that both of the d-axis voltage Vd and the q-axis voltage Vq are positive values. Hereinafter, the phrase of "positive-side" will be omitted appropriately.

As describe in FIG. 4A, when the pre-limit d-axis voltage command value FBd is equal to or less than the d-axis saturation prevention value Vd_max, the pre-limit d-axis voltage command value FBd is defined as the d-axis voltage command value Vd*. As describe in FIG. 4B, when the pre-limit d-axis voltage command value FBd is greater than the d-axis saturation prevention value Vd_max, the d-axis saturation prevention value Vd_max is defined as the d-axis voltage command value Vd*.

On the basis of the maximum voltage value V_max and the d-axis voltage command value Vd*, the first q-axis saturation prevention value Vq_max_H is calculated. By subtracting the dead zone width ΔV from the first q-axis saturation prevention value Vq_max_H, the second q-axis saturation prevention value Vq_max_L is calculated.

A temporal change of the q-axis voltage command value Vq* will be explained with referring to FIG. 5A and FIG. 5B. Each plot in FIG. 5A and FIG. 5B shows a value in each arithmetic period.

Figure 5A:
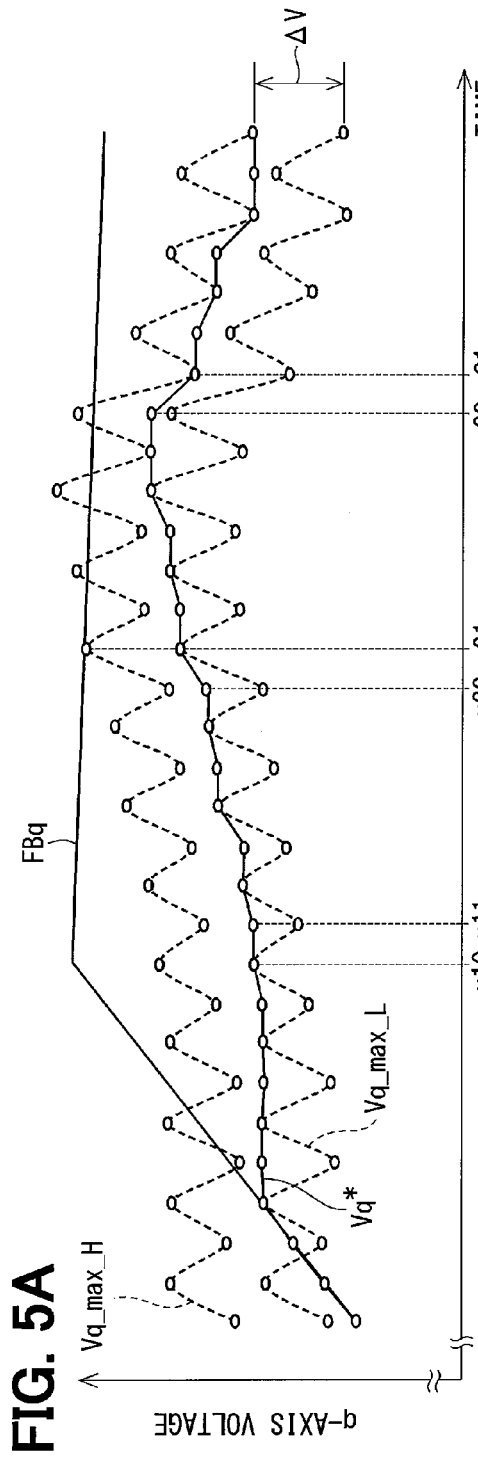
FIG. 5A is a time chart illustrating the q-axis voltage command value in a the first embodiment.
Figure 5B:
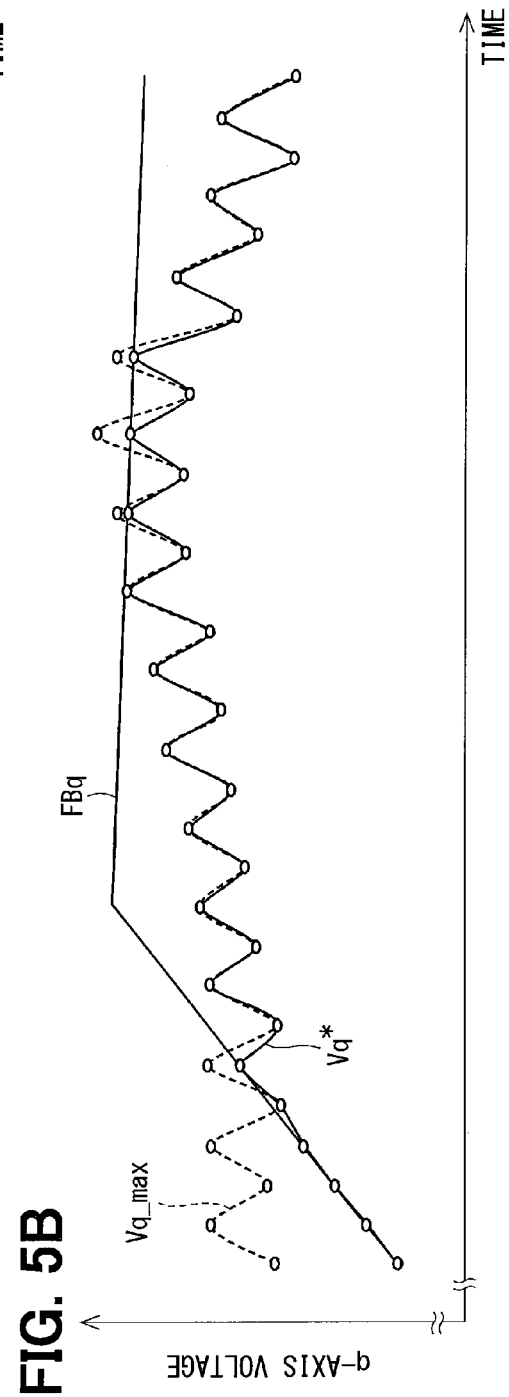
FIG. 5B is a time chart illustrating the q-axis voltage command value in a comparative example.

FIG. 5B is a comparative example. In this case, there is a single q-axis saturation prevention value Vq_max, and a dead zone is not provided. Incidentally, it is supposed that the single q-axis saturation prevention value Vq_max is equal to the first q-axis saturation prevention value Vq_max_H. As described in FIG. 5B, the q-axis saturation prevention value Vq_max changes according to a change of the d-axis voltage command value Vd*. Thus, when the pre-limit q-axis voltage command value FBq exceeds the q-axis saturation prevention value Vq_max, and when the q-axis voltage command value Vq* is set to the q-axis saturation prevention value Vq_max, the q-axis voltage command value Vq* may change, so that noise and vibration may occur according to torque fluctuation.

By contrast, in the present embodiment, a dead zone is provided between the first q-axis saturation prevention value Vq_max_H and the second q-axis saturation prevention value Vq_max_L, so that a variation of the q-axis voltage command value Vq* may be prevented.

As described in FIG. 5A, for example, as illustrated at a time x11, when the previous q-axis voltage command value Vq*$_{(n-1)}$, which corresponds to the q-axis voltage command value Vq* at a time x10 that is a previous calculation time, is equal to or greater than the second q-axis saturation prevention value Vq_max_L and is equal to or less than the first q-axis saturation prevention value Vq_max_H, the q-axis voltage command value Vq* at the time x11 is set to the previous q-axis voltage command value Vq*$_{(n-1)}$. That is, since the q-axis voltage command value Vq* at the time x10 is within the dead zone width at the time x11, the q-axis voltage command value Vq* at the time x10 (corresponding to the previous calculation time) is maintained at the time x11.

For example, as illustrated at a time x21, when the previous q-axis voltage command value Vq*$_{(n-1)}$, which corresponds to the q-axis voltage command value Vq* at a time x20 that is the previous calculation time, is less than the second q-axis saturation prevention value Vq_max_L, the q-axis voltage command value Vq* at the time x21 is set to the second q-axis saturation prevention value Vq_max_L.

For example, as illustrated at a time x31, when the previous q-axis voltage command value Vq*$_{(n-1)}$, which corresponds to the q-axis voltage command value Vq* at a time x30 that is the previous calculation time, is greater than the first q-axis saturation prevention value Vq_max_H, the q-axis voltage command value Vq* at the time x31 is set to the first q-axis saturation prevention value Vq_max_H.

In the present embodiment, two values of the first q-axis saturation prevention value Vq_max_H and the second q-axis saturation prevention value Vq_max_L are set as the saturation prevention values. In addition, a dead zone is provided between the first q-axis saturation prevention value Vq_max_H and the second q-axis saturation prevention value Vq_max_L. When an absolute value of the pre-limit q-axis voltage command value FBq is greater than an absolute value of the second q-axis saturation prevention value Vq_max_L, and the previous q-axis voltage command value Vq*$_{(n-1)}$ is within the dead zone width, a previous value is taken over as the q-axis voltage command value Vq*. Accordingly, as compared to a case where a single saturation prevention value is provided as described in FIG. 5B, it may be possible to prevent the q-axis voltage command value Vq* from changing, according to a variation of the d-axis voltage command value Vd*, and it may be possible to reduce noise and vibration.

As described above, the rotary electric machine control apparatus 1 controls the drive of the alternate current motor 10 in which an applied voltage is controlled by the inverter 20. The rotary electric machine control apparatus 1 has the controller 40. The controller 40 has the d-axis PI controller 44, the q-axis PI controller 45, the d-axis saturation prevention arithmetic portion 46, and the q-axis saturation prevention arithmetic portion 47.

The d-axis PI controller 44 calculates the pre-limit d-axis voltage command value FBd on the basis of the d-axis current command value Id* and the d-axis current Id.

The q-axis PI controller 45 calculates the pre-limit q-axis voltage command value FBq on the basis of the q-axis current command value Iq* and the q-axis current Iq.

The d-axis saturation prevention arithmetic portion 46 limits the pre-limit d-axis voltage command value FBd, and calculates the d-axis voltage command value Vd*.

The q-axis saturation prevention arithmetic portion 47 limits the pre-limit q-axis voltage command value FBq, and calculates the q-axis voltage command value Vq*.

It is supposed that a value having a greater absolute value of two values determining the dead zone width ΔV according to a limitation of the pre-limit q-axis voltage command value FBq is equal to the first q-axis saturation prevention value Vq_max_H and a value having a smaller absolute value is equal to the second q-axis saturation prevention value Vq_max_L.

When the absolute value of the pre-limit q-axis voltage command value FBq is greater than the absolute value of the second q-axis saturation prevention value Vq_max_L, and the absolute value of the previous q-axis voltage command value Vq*$_{(n-1)}$ that is the q-axis voltage command value at the previous time is equal to or greater than the absolute value of the second q-axis saturation prevention value Vq_max_L and is equal to or less than the absolute value of the first q-axis saturation prevention value Vq_max_H, the q-axis saturation prevention arithmetic portion 47 determines the previous q-axis voltage command value Vq*$_{(n-1)}$ as the q-axis voltage command value Vq*.

In the present embodiment, the dead zone is provided between the first q-axis saturation prevention value Vq_max_H and the second q-axis saturation prevention value Vq_max_L. When the absolute value of the pre-limit q-axis voltage command value FBq is greater than the absolute value of the second q-axis saturation prevention value Vq_max_L, and the previous q-axis voltage command value Vq*$_{(n-1)}$ is within the dead zone, the previous q-axis voltage command value Vq*$_{(n-1)}$ is defined as the q-axis voltage command value Vq*, that is, the previous value is taken over. Accordingly, even when the d-axis voltage command value Vd* changes, the q-axis voltage command value Vq* may be prevented from changing, and it may be possible to reduce noise and vibration according to torque fluctuation.

When the absolute value of the pre-limit q-axis voltage command value FBq is greater than the absolute value of the first q-axis saturation prevention value Vq_max_H, the q-axis saturation prevention arithmetic portion 47 determines a value corresponding to the first q-axis saturation prevention value Vq_max_H as the q-axis voltage command value Vq*. When the pre-limit q-axis voltage command value FBq is a positive value, the first positive-side q-axis saturation prevention value Vq_max_H is defined as the q-axis voltage command value Vq*. When the pre-limit q-axis voltage command value FBq is a negative value, the first negative-side q-axis saturation prevention value −Vq_max_H is defined as the q-axis voltage command value Vq*.

When the absolute value of the pre-limit q-axis voltage command value FBq is greater than the absolute value of the second q-axis saturation prevention value Vq_max_L, and when the absolute value of the previous q-axis voltage command value Vq*$_{(n-1)}$ is less than the second q-axis saturation prevention value Vq_max_L, the q-axis saturation prevention arithmetic portion 47 determines a value corresponding to the second q-axis saturation prevention value Vq_max_L as the q-axis voltage command value Vq*. When the pre-limit q-axis voltage command value FBq is a positive value, the second positive-side q-axis saturation prevention value Vq_max_L is defined as the q-axis voltage command value Vq*. When the pre-limit q-axis voltage command value FBq is a negative value, the second negative-side q-axis saturation prevention value −Vq_max_L is defined as the q-axis voltage command value Vq*.

Accordingly, it is possible to calculate the q-axis voltage command value Vq* appropriately.

Incidentally, when the absolute value of the pre-limit q-axis voltage command value FBq is equal to or less than the absolute value of the second q-axis saturation prevention value Vq_max_L, the q-axis saturation prevention arithmetic portion 47 determines the pre-limit q-axis voltage command value FBq as the q-axis voltage command value Vq*.

In the present embodiment, the d-axis PI controller 44 corresponds to an example of a pre-limit d-axis voltage arithmetic portion. The q-axis PI controller 45 corresponds to an example of a pre-limit q-axis voltage arithmetic portion. The d-axis saturation prevention arithmetic portion 46 corresponds to an example of a d-axis limit portion. The q-axis saturation prevention arithmetic portion 47 corresponds to an example of a q-axis limit portion. The first q-axis saturation prevention value Vq_max_H corresponds to an example of a first limit value. The second q-axis saturation prevention value Vq_max_L corresponds to an example of a second limit value.

Second Embodiment

Figure 6:
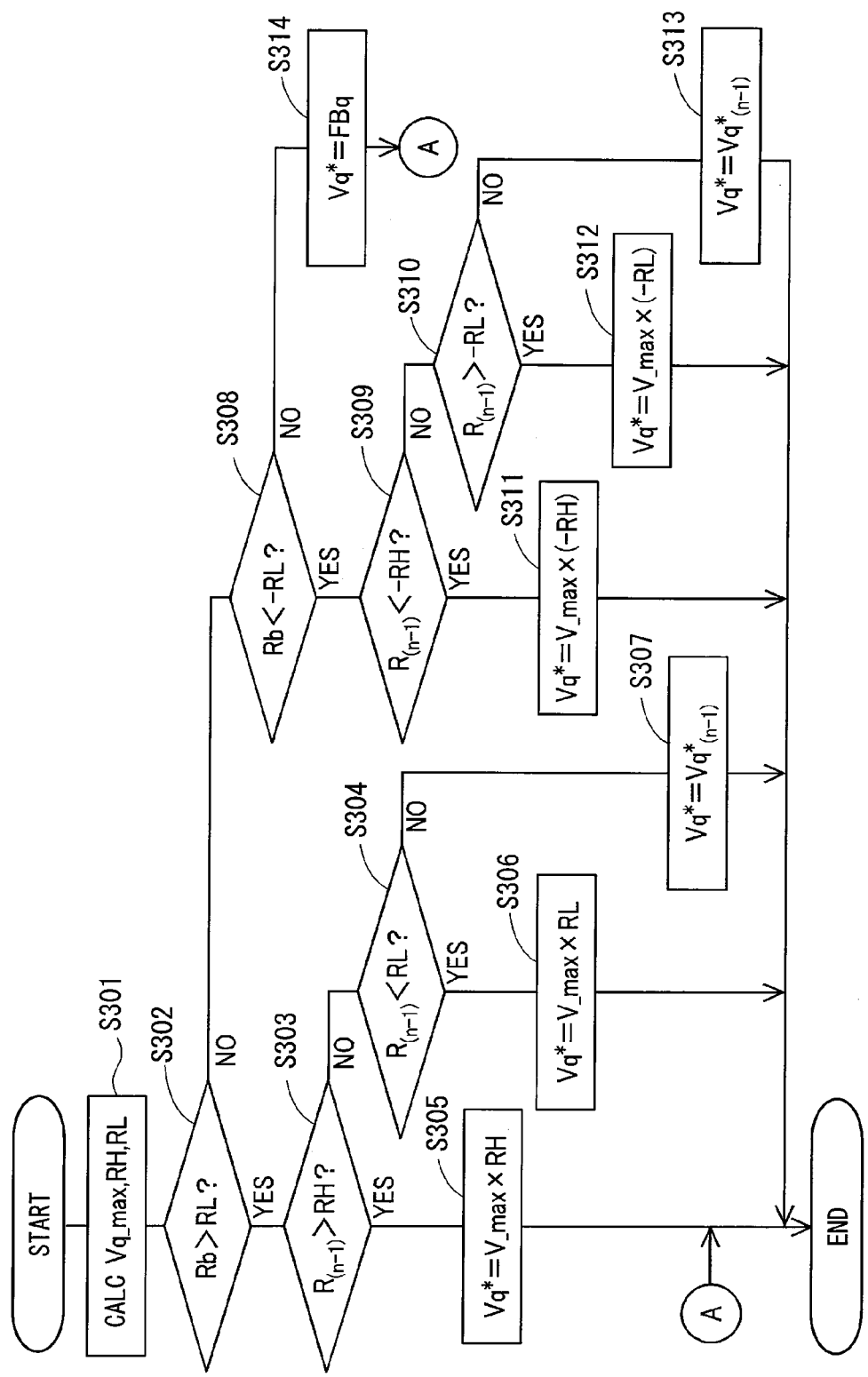
FIG. 6 is a flowchart illustrating the q-axis limit processing in a second embodiment.

A second embodiment in the present disclosure will be explained with referring to FIG. 6.

The first embodiment performs the q-axis limit processing by using the q-axis voltage command value Vq* itself. The second embodiment performs the q-axis limit processing by using a saturation rate.

The q-axis limit processing in the second embodiment will be explained on the basis of a flowchart in FIG. 6.

At S301, a q-axis saturation prevention value Vq_max, a first saturation rate RH, and a second saturation rate RL are calculated. The q-axis saturation prevention value Vq_max is equal to the first q-axis saturation prevention value Vq_max_H in the first embodiment. The first saturation rate RH is calculated by an expression (3), and the second saturation rate is calculated by an expression (4). Incidentally, a ΔR in the expression is a dead zone width.

$$RH = Vq\_max/V\_max \quad (3)$$

$$RL = RH - \Delta R \quad (4)$$

At S302, the pre-limit saturation rate Rb that is the saturation rate of the pre-limit q-axis voltage command value FBq is calculated, and it is determined whether the pre-limit saturation rate Rb is greater than the second positive-side saturation rate RL.

The pre-limit saturation rate Rb is calculated by an expression (5).

$$Rb = FBq/V\_max \quad (5)$$

When it is determined that the pre-limit saturation rate Rb is equal to or less than the second positive-side saturation rate RL (S302: NO), the processing shifts to S308. When it is determined that the pre-limit saturation rate Rb is greater than the second positive-side saturation rate RL (S302: YES), the processing shifts to S303.

At S303, it is determined whether the previous command saturation rate $R_{(n-1)}$ that is the saturation rate of the previous q-axis voltage command value $Vq^*_{(n-1)}$ is greater than the first positive-side saturation rate RH. The previous command saturation rate $R_{(n-1)}$ is calculated by an expression (6).

$$R_{(n-1)} = Vq^*_{(n-1)}/V\_max \quad (6)$$

When it is determined that the previous command saturation rate $R_{(n-1)}$ is greater than the first positive-side saturation rate RH (S303: YES), the processing shifts to S305. When it is determined that the previous command saturation rate $R_{(n-1)}$ is equal to or less than the first positive-side saturation rate RH (S303: NO), the processing shifts to S304.

At S304, it is determined whether the previous command saturation rate $R_{(n-1)}$ is less than the second positive-side saturation rate RL. When it is determined that the previous command saturation rate $R_{(n-1)}$ is less than the second positive-side saturation rate RL (S304: YES), the processing shifts to S306. When it is determined that the previous command saturation rate $R_{(n-1)}$ is equal to or greater than the second positive-side saturation rate RL (S304: NO), the processing shifts to S307.

When the previous command saturation rate $R_{(n-1)}$ is greater than the first positive-side saturation factor RH (S303: YES), the processing shifts to S305. At S305, the q-axis voltage command value Vq* corresponds to a value obtained by multiplying the maximum voltage value V_max by the first positive-side saturation rate RH (an expression (7)).

$$Vq^* = V\_max \times RH \quad (7)$$

When the previous command saturation rate $R_{(n-1)}$ is less than the second positive-side saturation factor RL (S304: YES), the processing shifts to S306. At S306, the q-axis voltage command value Vq* corresponds to a value obtained by multiplying the maximum voltage value V_max by the second positive-side saturation rate RL (an expression (8)).

$$Vq^* = V\_max \times RL \quad (8)$$

When the previous command rate $R_{(n-1)}$ is equal to or greater than the second positive-side saturation rate RL and also is equal to or less than the first positive-side saturation rate RH (S303: NO and also S304: NO), the q-axis voltage command value Vq* is equal to the previous q-axis voltage command value $Vq^*_{(n-1)}$.

At S308, which the processing shift to when it is determined that the pre-limit saturation rate Rb is equal to or less than the second positive-side saturation rate RL (S302: NO), it is determined whether the pre-limit saturation rate Rb is less than the second negative-side saturation rate −RL. When the pre-limit saturation rate Rb is equal to or greater than the second negative-side saturation rate −RL (S308: NO), the processing shifts to S314. When the pre-limit saturation rate Rb is less than the second negative-side saturation rate −RL (S308: YES), the processing shifts to S309.

At S309, it is determined whether the previous command saturation rate $R_{(n-1)}$ is less than the second negative-side saturation rate −RL. When the previous command saturation rate $R_{(n-1)}$ is less than the first negative-side saturation rate −RH (S309: YES), the processing shifts to S311. When the previous command saturation rate $R_{(n-1)}$ is equal to or greater than the first negative-side saturation rate −RH (S309: NO), the processing shifts to S310.

At S310, it is determined whether the previous command saturation rate $R_{(n-1)}$ is greater than the second negative-side saturation rate −RL. When it is determined that the previous command saturation rate $R_{(n-1)}$ is greater than the second negative-side saturation rate −RL (S310: YES), the processing shifts to S312. When it is determined that the previous command saturation rate $R_{(n-1)}$ is equal to or less than the second negative-side saturation rate −RL (S310: NO), the processing shifts to S313.

When the previous command saturation rate $R_{(n-1)}$ is less than the first negative-side saturation factor −RH (S309:

YES), the processing shifts to S311. At S311, a value obtained by multiplying the maximum voltage value V_max by the first negative-side saturation rate −RH as described in an expression (9) is defined as the q-axis voltage command value Vq*.

$$Vq^* = V\_\text{max} \times (-RH) \qquad (9)$$

When the previous command saturation rate $R_{(n-1)}$ is greater than the second negative-side saturation factor −RL (S310: YES), the processing shifts to S312. At S312, a value obtained by multiplying the maximum voltage value V_max by the second negative-side saturation rate −RL (an expression (10)) is defined as the q-axis voltage command value Vq*.

$$Vq^* = V\_\text{max} \times (-RL) \qquad (10)$$

When the previous command rate $R_{(n-1)}$ is equal to or greater than the first negative-side saturation rate −RH and also is equal to or less than the second negative-side saturation rate −RL (S309: NO and also S310: NO), the processing shifts to S313. At S313, the previous q-axis voltage command value $Vq^*_{(n-1)}$ is defined as the q-axis voltage command value Vq*.

When the pre-limit saturation rate Rb is equal to or greater than the second negative-side saturation rate −RL and also is equal to or less than the second positive-side saturation rate RL (S302: NO and also S308: NO), the processing shifts to S314. At S314, the pre-limit q-axis voltage command value FBq is defined as the q-axis voltage command value Vq*.

In the present embodiment, a rate of each value with respect to the maximum voltage value V_max is defined as a saturation rate. In order to prevent the output voltage of the inverter 20 from saturating, a limitation processing is performed according to the saturation rate. Specifically, two values including the first saturation rate RH and the second saturation rate RL are defined as saturation prevention values. In addition, a dead zone is provided between the first saturation rate RH and the second saturation rate RL. When an absolute value of the pre-limit saturation rate Rb is greater than the second saturation rate RL, and also the previous command saturation rate $R_{(n-1)}$ is within the dead zone width, a previous value is taken over as the q-axis voltage command value Vq*.

Accordingly, similar to the first embodiment, it may be possible to prevent a variation of the q-axis voltage command value Vq* according to a variation of the d-axis voltage command value Vd*, and it may be possible to reduce noise and vibration.

In the present embodiment, the q-axis saturation prevention arithmetic portion 47 calculates the q-axis voltage command value Vq* by using the pre-limit saturation rate Rb and the previous command rate $R_{n-1}$. The pre-limit saturation rate Rb is a rate of the pre-limit q-axis voltage command value FBq to the maximum voltage value V_max. The previous command saturation rate $R_{(n-1)}$ is a rate of the previous q-axis voltage command value $Vq^*_{(n-1)}$ to the maximum voltage value V_max.

More specifically, when the absolute value of the pre-limit saturation rate Rb is greater than the absolute value of the second saturation rate RL, and also the absolute value of the previous command saturation rate $R_{(n-1)}$ is equal to or greater than the absolute value of the second saturation rate RL and is equal to or less than the absolute value of the first saturation rate RH, the previous q-axis voltage command value $Vq^*_{(n-1)}$ is defined as the q-axis voltage command value Vq*.

When the absolute value of the previous command saturation rate $R_{(n-1)}$ is greater than the absolute value of the first saturation prevention value RH, the q-axis saturation prevention arithmetic portion 47 determines a value corresponding to the first saturation rate RH as the q-axis voltage command value Vq*. In the present embodiment, when the pre-limit q-axis voltage command value FBq is a positive value, a value obtained by multiplying the first positive-side saturation rate RH by the maximum voltage value V_max is defined as the q-axis voltage command value Vq*. When the pre-limit q-axis voltage command value FBq is a negative value, a value obtained by multiplying the first negative-side saturation rate −RH by the maximum voltage value V_max is defined as the q-axis voltage command value Vq*.

When the absolute value of the pre-limit saturation rate Rb is greater than the absolute value of the second saturation rate RL, and also the absolute value of the previous command saturation rate $R_{(n-1)}$ is less than the second saturation rate RL, the q-axis saturation prevention arithmetic portion 47 defines a value corresponding to the second saturation rate RL as the q-axis voltage command value Vq*. In the present embodiment, when the pre-limit q-axis voltage command value FBq is a positive value, a value obtained by multiplying the second positive-side saturation rate RL by the maximum voltage value V_max is defined as the q-axis voltage command value Vq*. When the pre-limit q-axis voltage command value FBq is a negative value, a value obtained by multiplying the second negative-side saturation rate −RL by the maximum voltage value V_max is defined as the q-axis voltage command value Vq*.

According to this configuration, a similar effect obtained in the first embodiment will be obtained.

In the present embodiment, the first saturation rate RH corresponds to an example of a first limit value, and the second saturation rate RL corresponds to an example of a second limit value.

Third Embodiment

Figure 7:
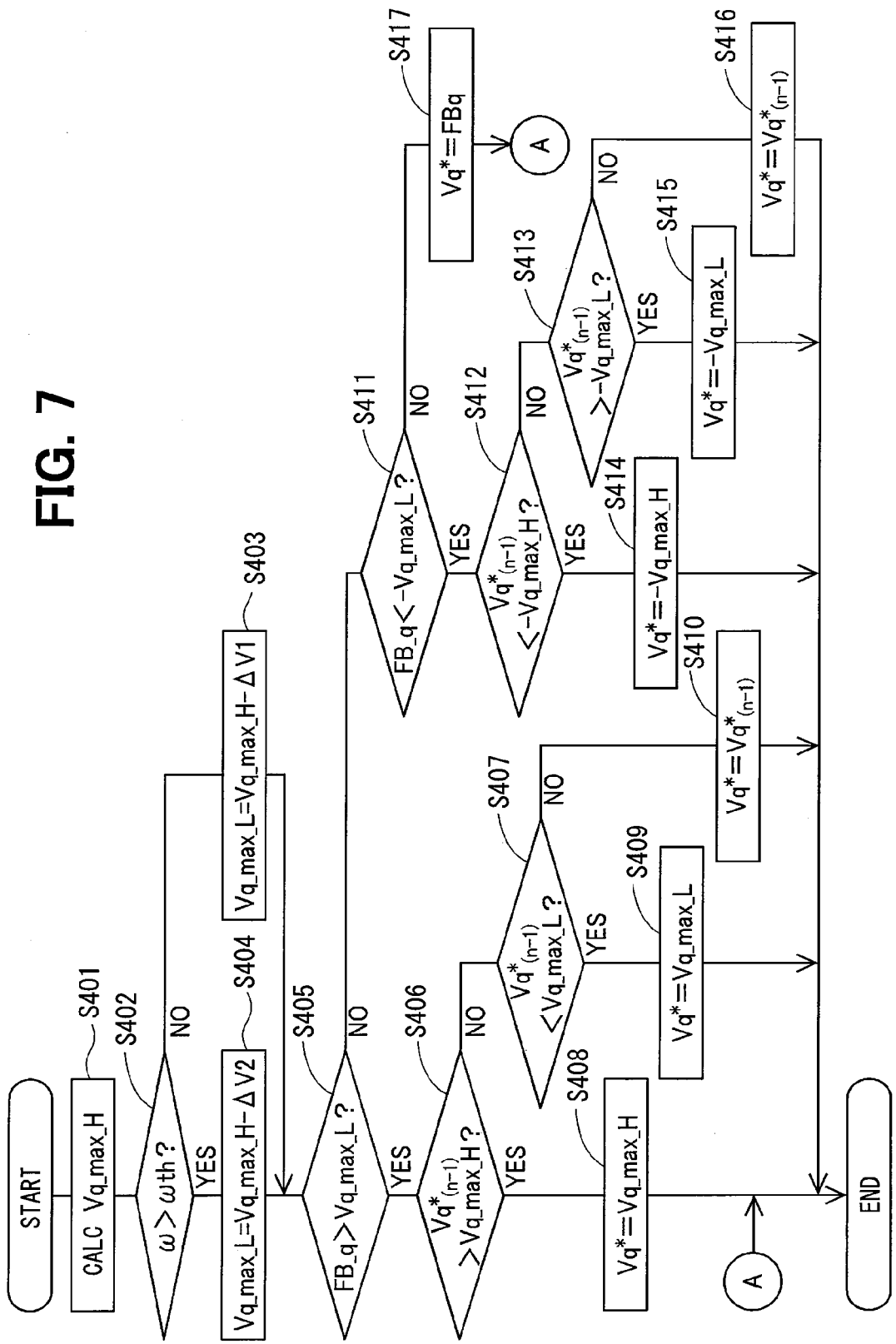
FIG. 7 is a flowchart illustrating the q-axis limit processing in a third embodiment.

A third embodiment will be explained with referring to FIG. 7.

In the present embodiment, according to a motor rotation angle speed ω, the dead zone width is changed. The q-axis limit processing in the present embodiment will be explained with referring to a flowchart in FIG. 7.

At S401, on the basis of the d-axis voltage command value Vd*, the first q-axis saturation prevention value Vq_max_H is calculated. Incidentally, an arithmetic method of the first q-axis saturation prevention value Vq_max_H is a similar manner in the first embodiment.

At S402, it is determined whether the motor rotation angle speed w is greater than a determination threshold ωth. The determination threshold ωth is set into a value greater than a predetermined value so that a priority is given to an output. when it is determined that the motor rotation angular speed ω is greater than the determination threshold ωth (S402: YES), the processing shifts to S404. When it is determined that the motor rotation angular speed ω is equal to or less than the determination threshold ωth (S402: NO), the processing shifts to S403.

At S403, a second q-axis saturation prevention value Vq_max_L is calculated by an expression (11). Incidentally, a ΔV1 in the expression corresponds to a dead zone width at a normal state (a normal-state dead zone width), and is equal to the dead zone width ΔV in the first embodiment.

$$Vq\_\text{max}\_L = Vq\_\text{max}\_H - \Delta V1 \qquad (11)$$

At S404, the second q-axis saturation prevention value Vq_max_L is calculated by an expression (12). Incidentally, a ΔV2 in the expression corresponds to a dead zone width at a high speed rotation state (a high-speed-state dead zone width), and is set to a value smaller than the normal-state dead zone width ΔV1. The high-speed-state dead zone width ΔV2 may be set to zero.

$$Vq\_max\_L = Vq\_max\_H - \Delta V2 \quad (12)$$

Figure 3:
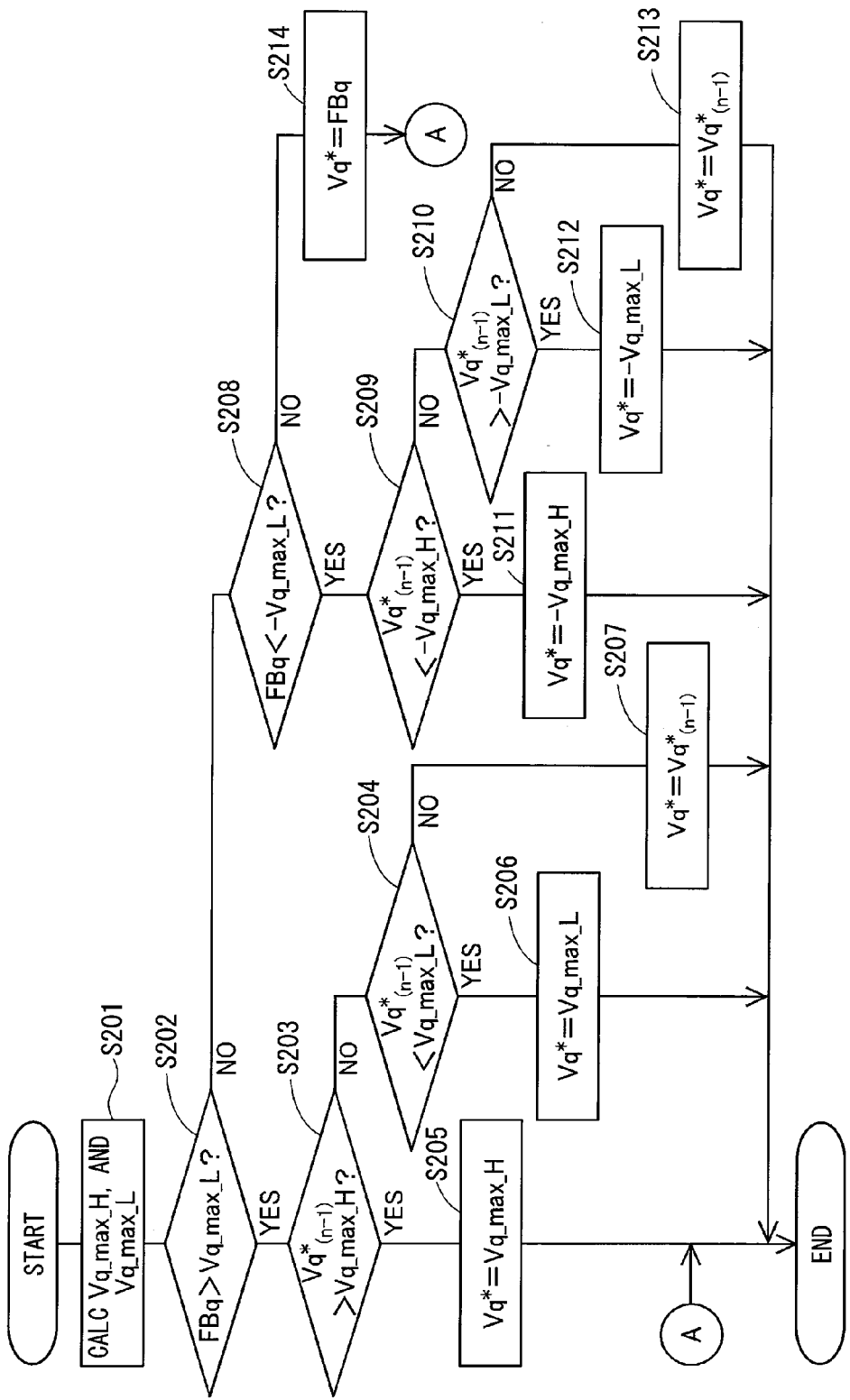
FIG. 3 is a flowchart illustrating q-axis limit processing in the first embodiment.

The processing from S405 to S417 is similar to the processing from S202 to S214 in the FIG. 3.

In the present embodiment, the dead zone widths ΔV1, ΔV2, which are differences of the first q-axis saturation prevention value Vq_max_H and the second q-axis saturation prevention value Vq_max_L, are variable according to the rotation angle speed w of the motor 10.

The high-speed-state dead zone width ΔV2 is set to a value smaller than the normal-state dead zone width ΔV1. Thus, when the motor 10 rotates at a high speed, it may be possible to give priority to the output rather than reduction of noise and vibration.

Fourth Embodiment

A fourth embodiment will be explained with referring to FIG. 8A, FIG. 8B and FIG. 9.

Figure 8A:
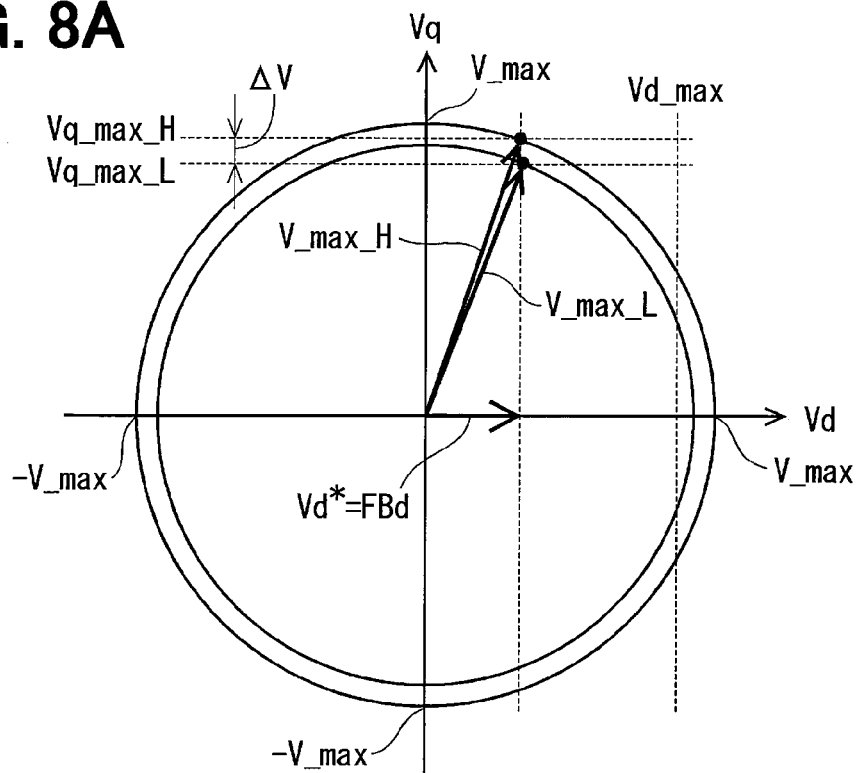
FIG. 8A is a diagram illustrating a saturation prevention value in a fourth embodiment.
Figure 8B:
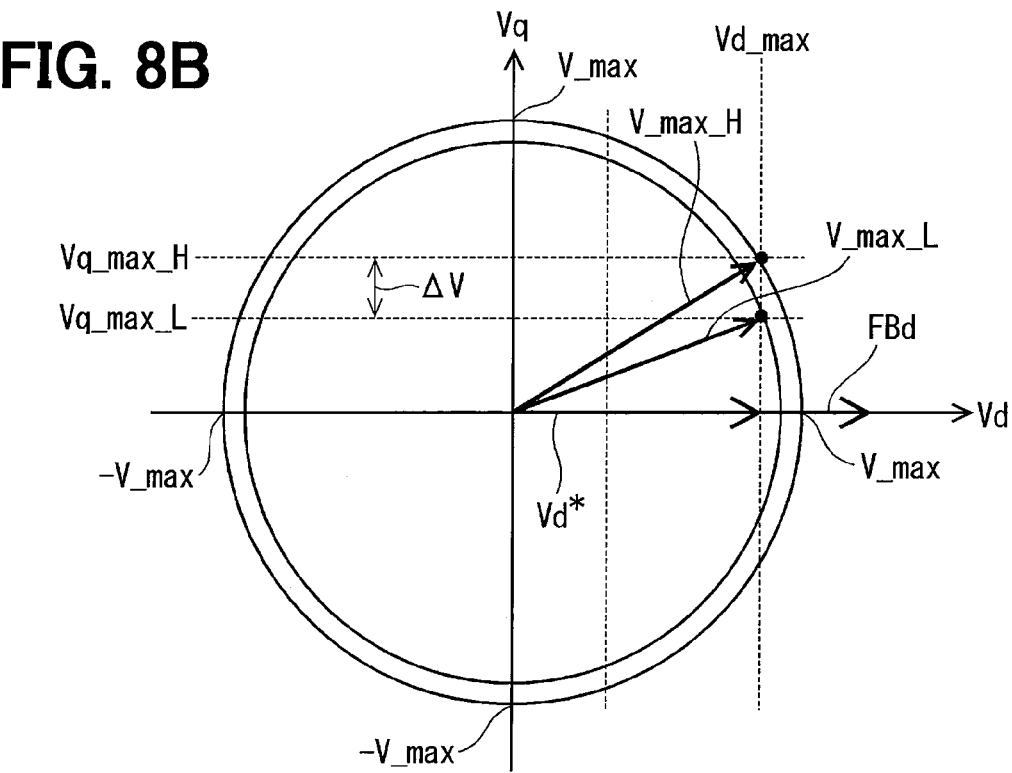
FIG. 8B is a diagram illustrating a saturation prevention value in the fourth embodiment.

FIG. 8A describes a case where the d-axis voltage command value Vd* is less than a predetermined value. FIG. 8B describes a case where the d-axis voltage command value Vd* is greater than a predetermined value. As described in FIG. 8A and FIG. 8B, a variation width of the first q-axis saturation prevention value Vq_max_H calculated by the expression (1) becomes a greater value when the first q-axis saturation prevention value Vq_max_H is varied in a region where the d-axis voltage command value Vd* has a greater value, as compared to a case when the first q-axis saturation prevention value Vq_max_H is varied in a region where the d-axis voltage command value Vd* has a smaller value.

In the present embodiment, the dead zone width ΔV is variable according to the d-axis voltage command value Vd*. Specifically, it is supposed that a circle having a radius of the maximum voltage value V_max in the dq coordinate is defined as the first saturation prevention value V_max_H. In addition, it is supposed that a circle having a predetermined radius less than the first saturation prevention value V_max_H is defined as the second saturation prevention value V_max_L. Incidentally, a difference of the first saturation prevention value V_max_H and the second saturation prevention value V_max_L on the q-axis corresponds to the dead zone width ΔV as described in FIG. 8A and FIG. 8B.

Figures 9, 10A, 10B, 11:
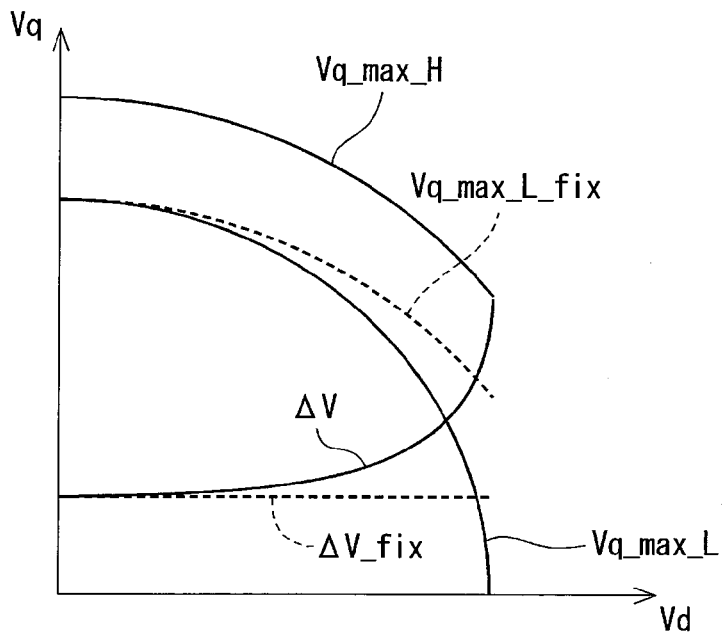
FIG. 9 is a diagram illustrating a dead band width in the fourth embodiment.
FIG. 10A is a diagram illustrating a first q-axis saturation prevention value.
FIG. 10B is a diagram illustrating a second q-axis saturation prevention value.
FIG. 11 is a diagram illustrating a second q-axis saturation prevention value in the fourth embodiment.

In the present embodiment, the second q-axis saturation prevention value Vq_max_L is calculated by an expression (13) described in FIG. 11.

The dead zone width ΔV is a difference of the first q-axis saturation prevention value Vq_max_H and the second q-axis saturation prevention value Vq_max_L, and is calculated by an expression (14).

$$\Delta V = Vq\_max\_H - Vq\_max\_L \quad (14)$$

As described in FIG. 9, the second q-axis saturation prevention value Vq_max_L is calculated by the expression (13), so that the dead zone width ΔV is variable according to the d-axis voltage command value Vd*. In other words, in the present embodiment, the second q-axis saturation prevention value Vq_max_L is calculated on the basis of the second saturation prevention value V_max_L and the d-axis voltage command value Vd*, and the dead zone width ΔV is varied according to the d-axis voltage command value Vd*.

Incidentally, in FIG. 9, a dead zone width is described as ΔV fix, and the second q-axis saturation prevention value is described as Vq_max_L fix at the time when a dead zone width is fixed, similar to the first embodiment.

The q-axis limit processing in the present embodiment is similar to the first embodiment except that a calculation expression of the second q-axis saturation prevention value Vq_max_L is different from the first embodiment.

In the present embodiment, the dead zone width ΔV is variable according to the d-axis voltage command value Vd*. Accordingly, it may be possible to prevent noise and vibration further when the d-axis voltage command value Vd* changes near the maximum voltage value V_max. When the d-axis voltage command value Vd* is near zero, it may be possible to prevent the output of the motor 10 from decreasing according to provision of a dead zone.

Other Embodiment

In the third embodiment and the fourth embodiment, the dead zone width is variable. As other embodiment, as described in the second embodiment, when the limit processing is performed on the basis of the saturation rate, the dead zone width may be variable similar to the third embodiment and the fourth embodiment.

The dead zone width may be variable on the basis of a value other than the rotation angle speed of the motor and the d-axis voltage command value.

In the present embodiment, when the absolute value of the pre-limit q-axis voltage command value is greater than the second limit value, so that the output voltage of the inverter is prevented from saturating, the q-axis voltage command value is limited and the saturation prevention is performed. In other embodiment, a determination whether the saturation prevention is performed or not may not be performed by using the second limit value. When the absolute value of the pre-limit q-axis voltage command value is greater than, for example, the absolute value of the first limit value, or when the absolute value of the pre-limit q-axis voltage command value is greater than the absolute value of the second limit value and less than the absolute value of the first limit value, the saturation prevention may be performed. For example, at S202 and also S208 in FIG. 3, the first q-axis saturation prevention value Vq_max_L may be used instead of the second q-axis saturation prevention value Vq_max_L. A predetermined value that is greater than the second q-axis saturation prevention value Vq_max_L and less than the first q-axis saturation prevention value Vq_max_H may be used instead of the second q-axis saturation prevention value Vq_max_L.

The explanation will be used in a case where the pre-limit saturation rate is used instead of the pre-limit q-axis voltage command value. At S302 and S308 in FIG. 6, the first saturation rate RH may be used instead of the second saturation rate RL. A predetermined value that is greater than the second saturation rate RL and less than the first saturation rate RH may be used instead of the second saturation rate RL.

Incidentally, the rotary electric machine is an electric motor in the embodiments. In other embodiment, the rotary electric machine may be a motor generator that has functions of an electric motor and a generator. In the embodiments, the rotary electric machine control apparatus is used in an electric power steering apparatus. In other embodiment, the rotary electric machine control apparatus may be used in any apparatus other than an electric power steering apparatus.

The motor 10 corresponds to an example of a rotary electric machine. The d-axis PI controller 44 corresponds to an example of a pre-limit d-axis voltage arithmetic portion.

The q-axis PI controller 45 corresponds to an example of a pre-limit q-axis voltage arithmetic portion. The d-axis saturation prevention arithmetic portion 46 corresponds to an example of a d-axis limit portion. The q-axis saturation prevention arithmetic portion 47 corresponds to an example of a q-axis limit portion.

It is noted that a flowchart or a processing of the flowchart in the present application includes steps (also referred to as sections), each of which is represented, for example, as S101. Further, each step may be divided into several sub-steps, and several steps may be combined into a single step.

While the rotary electric machine control apparatus has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A rotary electric machine control apparatus controlling drive of a rotary electric machine with applied voltage controlled by an inverter, the rotary electric machine control apparatus comprising:
   a pre-limit d-axis voltage arithmetic portion calculating a pre-limit d-axis voltage command value on a basis of a d-axis current command value and a d-axis current detection value;
   a pre-limit q-axis voltage arithmetic portion calculating a pre-limit q-axis voltage command value on a basis of a q-axis current command value and a q-axis current detection value;
   a d-axis limit portion limiting the pre-limit d-axis voltage command value to calculate a d-axis voltage command value; and
   a q-axis limit portion limiting the pre-limit q-axis voltage command value to calculate a q-axis voltage command value,
   wherein:
   a dead zone width is defined between a first limit value and a second limit value;
   the dead zone width relates to a limitation of the pre-limit q-axis voltage command value;
   an absolute value of the first limit value is greater than an absolute value of the second limit value;
   when an absolute value of the pre-limit q-axis voltage command value is greater than the absolute value of the second limit value, and an absolute value of a previous q-axis voltage command value is equal to or greater than the absolute value of the second limit value and is equal to or less than the absolute value of the first limit value, the q-axis limit portion determines the previous q-axis voltage command value as the q-axis voltage command value; and
   the previous q-axis voltage command value is the q-axis voltage command value in an immediately previous calculation.

2. The rotary electric machine control apparatus according to claim 1, wherein:
   when the absolute value of the previous q-axis voltage command value is greater than the absolute value of the first limit value, the q-axis limit portion determines a value corresponding to the first limit value as the q-axis voltage command value.

3. The rotary electric machine control apparatus according to claim 1, wherein:
   when the absolute value of the pre-limit q-axis voltage command value is greater than the absolute value of the second limit value, and the absolute value of the previous q-axis voltage command value is less than the second limit value, the q-axis limit portion determines a value corresponding to the second limit value as the q-axis voltage command value.

4. The rotary electric machine control apparatus according to claim 1, wherein:
   the dead zone width is variable according to a rotation angle speed of the rotary electric machine.

5. The rotary electric machine control apparatus according to claim 1, wherein:
   the dead zone width is variable according to the d-axis voltage command value.

6. A rotary electric machine control apparatus controlling drive of a rotary electric machine with applied voltage controlled by an inverter, the rotary electric machine control apparatus comprising:
   a pre-limit d-axis voltage arithmetic portion calculating a pre-limit d-axis voltage command value on a basis of a d-axis current command value and a d-axis current detection value;
   a pre-limit q-axis voltage arithmetic portion calculating a pre-limit q-axis voltage command value on a basis of a q-axis current command value and a q-axis current detection value;
   a d-axis limit portion limiting the pre-limit d-axis voltage command value to calculate a d-axis voltage command value; and
   a q-axis limit portion limiting the pre-limit q-axis voltage command value to calculate a q-axis voltage command value,
   wherein:
   a dead zone width is defined between a first saturation rate and a second saturation rate;
   the dead zone width relates to a limitation of a pre-limit saturation rate;
   an absolute value of the first saturation rate is greater than an absolute value of the second saturation rate;
   when an absolute value of the pre-limit saturation rate is greater than the absolute value of the second saturation rate, and an absolute value of a previous command saturation rate is equal to or greater than the absolute value of the second saturation rate and is equal to or less than the absolute value of the first saturation rate, the q-axis limit portion determines a previous q-axis voltage command value as the q-axis voltage command value;
   the previous command saturation rate is a rate of the previous q-axis voltage command value to a maximum voltage value; and
   the pre-limit saturation rate is a ratio of the pre-limit q-axis voltage command value to a maximum voltage value.

7. The rotary electric machine control apparatus according to claim 6, wherein:
   the dead zone width is variable according to a rotation angle speed of the rotary electric machine.

8. The rotary electric machine control apparatus according to claim 6, wherein:
   the dead zone width is variable according to the d-axis voltage command value.

* * * * *